Patented Oct. 28, 1924.

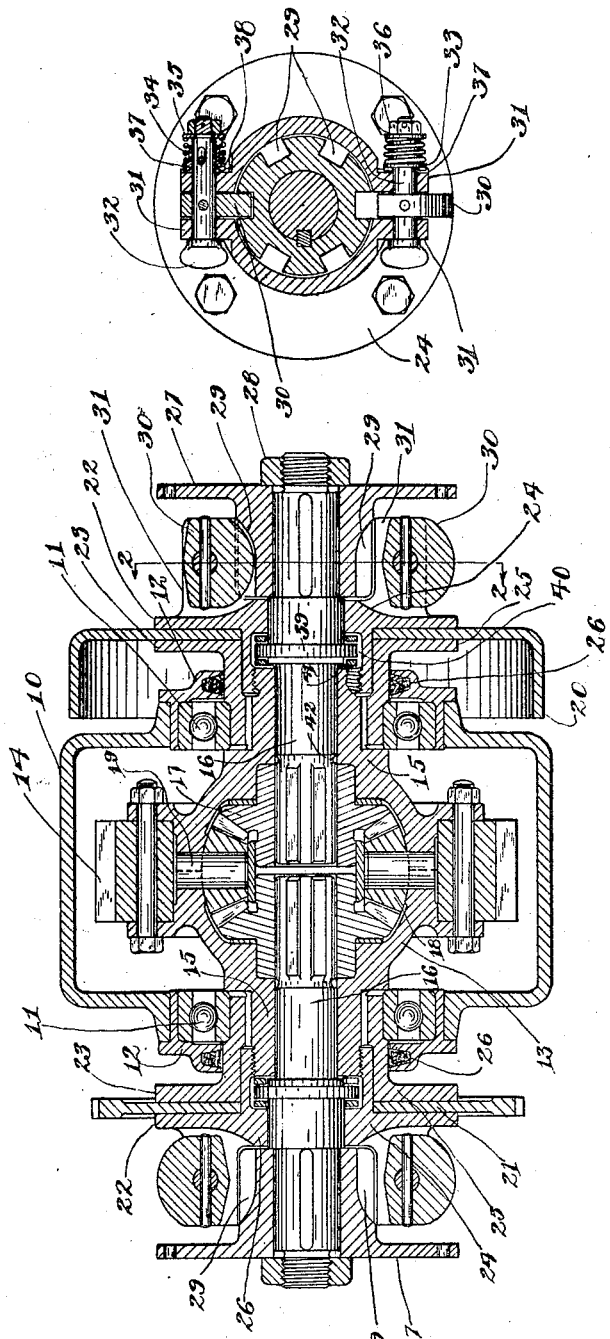

1,513,029

UNITED STATES PATENT OFFICE.

JOHN F. BOLGIANO, OF DAYTON, OHIO.

DIFFERENTIAL-LOCKING DEVICE.

Application filed September 12, 1923. Serial No. 662,256.

*To all whom it may concern:*

Be it known that I, JOHN F. BOLGIANO, a citizen of the United States, residing at Dayton, in the county of Montgomery and State of Ohio, have invented certain new and useful Improvements in Differential-Locking Devices, of which the following is a specification.

This invention relates to a differential locking device adapted for use in power transmissions generally, but herein more particularly designed and intended for use in the driving transmissions of vehicles.

The principal object of the invention is to provide a locking device for differentials which is simple and practical in construction and operation and capable of quick and easy manipulation.

Another object is to provide a differential structure embodying a novel means for effecting a braking action for the driven parts and for indicating the driving speeds.

Still other objects and advantages of the invention will be set forth in the following detailed description of the illustrated embodiment of the invention.

In the drawing,

Fig. 1 is a central longitudinal section of a differential structure embodying therein the elements of the present invention, and Fig. 2 is a cross-sectional detail taken in the plane of line 2—2 of Fig. 1, looking in the direction indicated by the arrows.

In the following description, the same reference numerals refer to the same parts in both views.

Referring to the drawing, the differential is shown enclosed in a casing 10 and received in roller bearings 11 in closure plates 12 at opposite sides of the casing. The differential proper comprises the housing 13 which is sectional in form and has bolted between the sections thereof a ring gear 14 arranged to be driven in any desired or conventional manner. The housing 13 is formed with hollow cylindrical bearing extensions 15 projecting out of the casing at opposite sides and providing bearings for the inner ends of the shafts 16. The shafts 16 are splined in bevel pinions 17 inside the housing 13, the pinions 17 being in constant mesh with other bevel pinions 18 carried on radial studs 19 in the housing 13. In this way, power communicated to the gear 14 is transmitted differentially to the shafts 16 in a well understood manner.

The housing 13 is arranged to carry rigid therewith a brake drum 20 on one side outside the casing 10 and a speedometer gear 21 on the other side. The drum and gear are each bolted between flanges 22 and 23 on a coupling nut 24 and a bearing ring 25 respectively. The nuts 24 thread onto the outer ends of the bearing extensions 15 of the housing 13 and the rings 25 are received in the bearings 11, felt packing washers 26 being provided suitably to prevent the leakage of lubricant.

It is apparent from the description thus far that the braking action which may be secured by the drum 20 will be effectual without interfering with the equalizing function of the differential so that, if applied to a vehicle, it is possible to brake the motion of the vehicle turning a corner, without fear of causing skidding which sometimes results when brakes on the wheels are applied when the wheels are turning at different speeds. The gear 21 when connected with a speedometer in the usual way serves to indicate speed at which the vehicle is being driven. This arrangement for the speedometer take-off has decided and apparent advantages over the conventional front wheel speedometer drive as it gives the exact driving speed of the vehicle regardless of whether or not the vehicle is traveling in a straight course.

The shafts 16 extend out of the housing 13 and are fitted with coupling collars or hubs 27 keyed to the shafts and held by nuts 28. The hubs 27 have flanges to which may be bolted the driving wheels of the vehicle. The hubs 27 are longitudinally notched in their periphery at their inner ends as shown at 29, to receive latches or splines 30 rotatably mounted between spaced parallel ears 31 projecting from the outer sides of the nuts 22. The bolts 32, on which the latches are pinned as shown, may be turned manually by grasping the thumb-piece ends thereof. The latches are normally in retracted inoperative position, being held in such position by spring-pressed collets 33 having a pin and slot connection on the outer ends of the bolts 32. Springs 34 held between the collets 33 and washers 35 by nuts 36 threaded on the outer ends of the bolts 32 serve to move the collets normally inwardly against the outer face of the adjacent ears 31 so that wedge-shaped projections 37 on the collets ride into grooves 38 in the ears and hold the bolts 32 yieldingly in adjusted position.

In operation, the vehicle normally operates with a differential transmission of power to the shafts 16 so that the wheels may turn at different relative speeds. However where the wheels are positioned more or less closely together or are relatively small in diameter, so that undue wearing of tires would not result in their being driven together at the same speed around corners, it is practicable by means of the arrangement hereinbefore described to lock the differential without much difficulty so that the wheels will be driven in the desired manner. It also frequently is desired to lock the differential where a vehicle becomes mired and it is only by transmission of power alike to both wheels that the vehicle can be driven out. The latches 30, in such cases may quickly be turned into operative engagement in the notches 29 in the manner in which one is shown in the drawing so that the shafts 16 are locked with the housing 13 and turn therewith as a unit. The locking arrangement shown has further utility in case of emergency, as, for example, where one of the shafts or pinions breaks. In such event the locking of the shafts at their outer ends with the differential housing enables the vehicle to proceed until the necessary replacement or repair may be made.

In the latter contingency mentioned, the outer portions of the shafts 16, if the shafts were broken, would move endwise out of the housing unless provision were made to prevent this. Annular ribs 39 are provided integral with the shafts 16 rotatable in annular recesses 40 in the nuts 22. Replaceable bearing thrust rings 41 may also be provided on opposite sides of the ribs 39 to take up end play in the shafts 16.

It is further contemplated to provide the shafts 16 with a fracture point, say at the groove 42 in the shafts 16 so that in the event of a breaking strain the fracture will occur in one of the shafts 16 which can be replaced more readily than one of the differential pinions and at less expense.

The invention is not to be construed as limited to the structure illustrated nor to a structure used in the particular connection stated but is clearly capable of modifications and adaptations not involving a departure from the spirit of the invention as defined in the appended claims.

I claim:—

1. In a differential transmission mechanism, a driven transmission gearing housing, differential transmission gearing in said housing, driven shafts extending into said housing operatively connected with said gearing therein, and means for locking said shafts to said housing, said means comprising pivoted latches rotatable from inoperative position and means to be engaged thereby, said latches and means to be engaged thereby being provided on said housing and shafts.

2. In a differential transmission mechanism, a driven transmission gearing housing, differential transmission gearing in said housing, driven shafts extending into said housing operatively connected with said gearing therein, and means for locking said shafts to said housing, said means comprising latches rigidly carried by said housing, means for normally retaining said latches in inoperative position, and means on said shafts to be engaged by said latches when the latter are moved to operative position.

3. In a transmission mechanism, a transmission casing, bearings therein, a transmission gearing housing in said casing received in said bearings having an extension to without the casing, differential transmission gearing in said housing, a driven shaft extending from without into said housing operatively connected with said gearing therein, a drive coupling on said shaft, and means between said housing and said coupling for locking the latter with said housing.

4. In a transmission mechanism, a casing, a differential gearing housing in said casing having bearing extensions received in the side walls of said casing, stub propeller shafts extending through said bearing extensions to have gearing connections in said housing and protruding slightly from the outer ends of said bearing extensions, drive couplings mounted on the protruding portions of said shafts, and means for locking together said couplings and said bearing extensions outside said casing.

5. In a differential, a casing, a gear housing rotating in bearings in said casing having extensions through the side walls thereof, providing a place for application of devices such as a differential brake drum or speedometer gear, shaft sections extending through said extensions for differential gearing connections inside said housing, and means outside said casing for selectively connecting together said shaft sections and said housing.

6. In a transmission mechanism, a casing, a differential housing in said casing having differential gears therein, shafts extending into opposite sides of said housing connected with said differential gears therein, said shafts having weak portions intermediate the ends thereof to insure breaking on over-load outside said housing and also to avoid breakage of any of the differential gears in said housing, and means for locking said housing to the outer portions of said shafts.

7. In a power transmission, a casing, a differential housing therein, coupling members on opposite sides of said casing having permanent connection with said housing therein and adapted for driving devices such as a speedometer gear or brake drum, propeller shafts extending freely through said coupling members into said housing for driving connections, drive couplings on the ends of said shafts, and means for detachably connecting said drive couplings to said first mentioned coupling members.

8. In a power transmission, a casing, a differential housing therein, coupling members on opposite sides of said casing having permanent connection with said housing therein and adapted for driving devices such as a speedometer gear or brake drum, propeller shafts extending freely through said coupling members into said housing for driving connections, drive couplings on the ends of said shafts, and means for detachably connecting said drive couplings to said first mentioned coupling members, comprising latches rotatable in the longitudinal plane of said shafts to engage longitudinal notches in said coupling members, and detent means for holding said latches against movement.

In testimony whereof I affix my signature.

JOHN F. BOLGIANO.